US010611692B2

(12) United States Patent
Luebbe et al.

(10) Patent No.: US 10,611,692 B2
(45) Date of Patent: Apr. 7, 2020

(54) OPAQUE RED POLYCRYSTALLINE CERAMIC

(71) Applicants: The Swatch Group Research and Development Ltd, Marin (CH); EMPA, Swiss Federal Laboratories for Materials Testing and Research, Duebendorf (CH)

(72) Inventors: Henning Luebbe, Bienne (CH); Roman Kubrin, Zurich (CH); Gurdial Blugan, Duebendorf (CH); Jakob Kuebler, Herdern (CH); Stewes Bourban, Chabrey (CH); Arnaud Actis-Datta, Bassecourt (CH)

(73) Assignees: The Swatch Group Research and Development Ltd, Marin (CH); EMPA, Swiss Federal Laboratories for Materials Testing and Research, Duebendorf (CH)

( * ) Notice: Subject to any disclaimer, the term of this patent is extended or adjusted under 35 U.S.C. 154(b) by 36 days.

(21) Appl. No.: 16/082,358

(22) PCT Filed: Mar. 9, 2017

(86) PCT No.: PCT/EP2017/055575
§ 371 (c)(1),
(2) Date: Sep. 5, 2018

(87) PCT Pub. No.: WO2017/157759
PCT Pub. Date: Sep. 21, 2017

(65) Prior Publication Data
US 2019/0092691 A1    Mar. 28, 2019

(30) Foreign Application Priority Data
Mar. 15, 2016 (EP) .................... 16160506

(51) Int. Cl.
| *C04B 35/111* | (2006.01) |
| *C04B 35/626* | (2006.01) |
| *G04B 31/004* | (2006.01) |
| *G04B 19/12* | (2006.01) |
| *G04B 19/28* | (2006.01) |
| *G04B 19/04* | (2006.01) |
| *G04B 37/22* | (2006.01) |

(52) U.S. Cl.
CPC ...... *C04B 35/111* (2013.01); *C04B 35/62695* (2013.01); *G04B 19/042* (2013.01); *G04B 19/12* (2013.01); *G04B 19/28* (2013.01); *G04B 31/004* (2013.01); *G04B 37/225* (2013.01); *C04B 2235/3206* (2013.01); *C04B 2235/3241* (2013.01); *C04B 2235/443* (2013.01); *C04B 2235/449* (2013.01); *C04B 2235/5427* (2013.01); *C04B 2235/5436* (2013.01); *C04B 2235/77* (2013.01); *C04B 2235/9661* (2013.01)

(58) Field of Classification Search
CPC ..................................................... C04B 35/111
See application file for complete search history.

(56) References Cited

U.S. PATENT DOCUMENTS

| 3,026,210 A | 3/1962 | Coble |
| 4,204,874 A | 5/1980 | Yamada |
| 8,993,466 B2* | 3/2015 | Pujol ................. C04B 35/111 501/127 |
| 2013/0072373 A1* | 3/2013 | Pujol ................. C04B 35/111 501/135 |

FOREIGN PATENT DOCUMENTS

GB    2 010 236 A    6/1979

OTHER PUBLICATIONS

International Search Report dated Apr. 5, 2017 in PCT/EP2017/055575 filed Mar. 9, 2017.

* cited by examiner

*Primary Examiner* — Karl E Group
(74) *Attorney, Agent, or Firm* — Oblon, McClelland, Maier & Neustadt, L.L.P.

(57) ABSTRACT

A polycrystalline ceramic solely formed based on alumina, on chromium oxide and on magnesium oxide, where the polycrystalline ceramic contains between 0.8% and 1.2% of chromium oxide by total weight of the polycrystalline ceramic and between 0.03% and 0.09% of magnesium oxide by total weight of the polycrystalline ceramic, making it possible to obtain a red ceramic with a toughness ($K_c$) at least equal to 2.8 MPa·m$^{1/2}$.

11 Claims, No Drawings

OPAQUE RED POLYCRYSTALLINE CERAMIC

CROSS REFERENCE TO RELATED APPLICATION

This is a National phase Application in the United States of International Patent Application PCT/EP2017/055575 filed on Mar. 9, 2017 which claims priority on European patent application No. 16160506.8 filed on Mar. 15, 2016. The entire disclosure of the above patent applications are hereby incorporated by reference.

FIELD OF THE INVENTION

The invention relates to an opaque red polycrystalline ceramic and to a process for the manufacture of such a ceramic.

BACKGROUND OF THE INVENTION

It has been known since the 1970s to form bearings based on polycrystalline ceramic. This is because, as regards bearings usually formed from monocrystalline ruby which is transparent, the studies of the 1970s, such as, for example, in the document GB 2 010 236, consisted in manufacturing bearings based on polycrystalline ceramic which are capable of replacing, at reduced cost, the monocrystalline ruby, that is to say while coming as close as possible thereto with regard to the color and the transparency.

The document GB 2 010 236 thus provides for the formation of a polycrystalline ceramic based on alumina, on chromium oxide and on magnesium oxide and for the addition thereto of strontium oxide in order to obtain a polycrystalline ceramic similar to a monocrystalline ruby both in terms of color and of transparency.

However, while this composition may be satisfactory as a replacement for the monocrystalline ruby, the known polycrystalline ceramics are not, on the other hand, satisfactory in terms of appearance (excessively pink and excessively transparent color) and of mechanical characteristics (excessively low toughness) for them to be able to be used for a part of the exterior of a timepiece.

SUMMARY OF THE INVENTION

The aim of the present invention is to overcome all or some of the abovementioned disadvantages by providing a polycrystalline ceramic which is red in color and opaque for a customary thickness of the exterior part of a timepiece while having a toughness of greater than or equal to 2.8 $MPa \cdot m^{1/2}$.

To this end, the invention relates to a polycrystalline ceramic solely formed based on alumina, on chromium oxide and on magnesium oxide, characterized in that the polycrystalline ceramic comprises between 0.8% and 1.2% of chromium oxide by total weight of the polycrystalline ceramic and between 0.03% and 0.09% of magnesium oxide by total weight of the polycrystalline ceramic, making it possible to obtain a red ceramic with a toughness ($K_r$) at least equal to 2.8 $MPa \cdot m^{1/2}$.

Thus, surprisingly, it has been found that, by varying solely the proportions of chromium oxide and of magnesium oxide, with respect to that of alumina, it is possible to obtain all the desired advantages. It turned out, by virtue in particular of the surprisingly high toughness $K_c$ obtained, that it was possible, subsequent to the manufacture of the polycrystalline ceramic, to inlay metal inserts, such as, for example, according to the process disclosed in the document EP 2 315 673, incorporated by reference in the present description.

Consequently, contrary to the studies of the 1970s, such as, for example, the document GB 2 010 236, it turned out that it is not necessary to add other metal oxides in order to improve the appearance and/or the mechanical characteristics.

In accordance with other advantageous alternative forms of the invention:
- the polycrystalline ceramic comprises a density at least equal to 3.9 $g \cdot cm^{-3}$,
- the polycrystalline ceramic comprises a CIELAB colorimetric space, the hue angle (H) of which is between 19° and 27°;
- the polycrystalline ceramic comprises a CIELAB colorimetric space, the L* component of which is between 37 and 45, the a* component of which is between 15 and 26 and the b* component of which is between 5 and 13;
- the polycrystalline ceramic comprises substantially 98.92% of alumina, substantially 1.02% of chromium oxide and substantially 0.06% of magnesium oxide.

Furthermore, the invention relates to a timepiece, characterized in that it comprises a member completely or partially formed using a polycrystalline ceramic according to one of the preceding alternative forms.

Finally, the invention relates to a process for the manufacture of a red and opaque polycrystalline ceramic, characterized in that the process comprises the following stages:
a) forming a mixture in the powder form comprising between 0.5 mol % and 0.8 mol % of chromium cations, between 0.04 mol % and 0.12 mol % of magnesium cations and the remainder as aluminum cations in the alumina form;
b) grinding the powder;
c) carrying out an atomization of the ground powder in order to obtain aggregates;
d) shaping the aggregates in order to obtain a green body;
e) transforming the green body into ceramic in order to obtain the polycrystalline ceramic.

In accordance with other advantageous alternative forms of the invention:
- stage a) is carried out by the liquid route;
- the aggregates obtained during stage c) are substantially spherical and comprise a diameter of between 30 and 120 µm;
- stage d) comprises a pressing of the aggregates in a mold;
- stage e) comprises a sintering of the green body.

DETAILED DESCRIPTION OF THE PREFERRED EMBODIMENTS

As explained above, the invention relates to a polycrystalline ceramic formed based on alumina, on chromium oxide and on magnesium oxide and in particular to an exterior part formed based on such a polycrystalline ceramic.

This exterior part has been devised for applications in the watchmaking field. It is possible, by way of example, to envisage forming a case, a dial, a display, a decoration, a marker, an applied chapter, a flange, a bezel, a push-button, a crown, a caseback, a hand or a strap completely or partially based on a polycrystalline ceramic according to the invention.

The object of the initial study was the manufacture of a red and opaque polycrystalline ceramic comprising mechanical characteristics capable of forming a part of the exterior of a timepiece. The study began by selecting ceramics based on alumina and zirconia which are the bases generally used in watchmaking. However, it turned out that it was difficult to obtain zirconia-based ceramics with a satisfactory color and that it was difficult to obtain alumina-based ceramics with satisfactory mechanical characteristics.

The study arbitrarily favored the approach of a satisfactory color, that is to say red and opaque, and consequently selected a development of alumina-based ceramic. However, surprisingly, it was found, during the manufacturing tests, that, according to the proportions of chromium oxide and of magnesium oxide, with respect to that of alumina, it is possible to obtain the desired advantages, and in particular to obtain a sufficient toughness that is to say a toughness typically of greater than or equal to 2.8 MPa·m$^{1"2}$, which makes it possible to use the polycrystalline ceramic for any exterior part of a timepiece.

Surprisingly, it even turned out, by virtue in particular of the toughness $K_c$ thus obtained, that it was possible, subsequent to the manufacture of the polycrystalline ceramic, to inlay metal inserts, such as, for example, according to the process disclosed in the document EP 2 315 673, incorporated by reference in the present description.

It is thus understood that, contrary to the studies of the 1970s, such as, for example, the document GB 2 010 236, it turned out that it is not necessary to add other metal oxides in order to improve the appearance and/or the mechanical characteristics.

In order to obtain these advantages, the polycrystalline ceramic comprises, according to the invention, between 0.8% and 1.2% of chromium oxide by total weight of the polycrystalline ceramic and between 0.03% and 0.09% of magnesium oxide by total weight of the ceramic, the remainder being formed by alumina, in order to obtain a red ceramic with a toughness $K_c$ at least equal to 2.8 MPa·m$^{1'2}$.

The color red, according to the invention, means that the ceramic comprises a CIELAB colorimetric space (standard ISO 11664-4 defined by the International Commission on Illumination), the L* component of which is between 37 and 45, the a* component of which is between 15 and 26 and the b* component of which is between 5 and 13.

This CIELAB colorimetric space comprises, according to the invention, a hue angle H, that is to say the slope which the coordinates of the components a* and b* form with respect to the point of origin for which the components a* and b* are equal to 0, which is between 19° and 27°.

The opaque nature means a transmission factor, sometimes known as transmittance, of less than or equal to approximately 9% for a ceramic thickness of approximately 400 μm and a light source combining all the wavelengths (white light).

The mechanical characteristics of five examples of the study are combined in table 1 below:

TABLE 1

| | Al$_2$O$_3$ % | Cr$_2$O$_3$ % | MgO % | d g·cm$^{-3}$ | Hardness VH | K$_c$ MPa·m$^{1/2}$ |
|---|---|---|---|---|---|---|
| 1 | 98.96 | 1.02 | 0.02 | 3.95 | 1820 | 2.5 |
| 2 | 98.95 | 1.02 | 0.03 | 3.90 | 1870 | 2.8 |
| 3 | 98.92 | 1.02 | 0.06 | 3.98 | 2050 | 3.0 |
| 4 | 98.87 | 1.02 | 0.11 | 3.97 | 1910 | 2.4 |
| 5 | 98.83 | 1.02 | 0.15 | 3.96 | 1920 | 2.3 |

The colorimetric characteristics of the five examples of table 1 are combined in table 2 below:

TABLE 2

| | L* | a* | b* | C | H ° |
|---|---|---|---|---|---|
| 1 | 44.9 | 23.4 | 10.6 | 25.7 | 23.6 |
| 2 | 44.5 | 25.9 | 12.7 | 28.9 | 26.2 |
| 3 | 41.2 | 20.7 | 8.6 | 22.4 | 22.5 |
| 4 | 43.0 | 22.1 | 9.6 | 24.1 | 23.6 |
| 5 | 42.5 | 22.2 | 10.2 | 24.4 | 24.6 |

Each table was formed with the mean of the values of several samples for each composition. The toughness $K_c$ values were obtained from Vickers hardness measurements according to a load of 3 kgf using a Wolpert DIA Testor 2N microdurometer. The values of the CIELAB colorimetric space were obtained on polished samples using a Konika Minolta CM 3610A spectrophotometer.

The proportion of chromium oxide influences the red color of the alumina-based polycrystalline ceramic. A low proportion will give a pale red tint and an excessively high proportion will give a strong pink tint. During the study in order to obtain a red ceramic, a proportion of between 0.8% and 1.2% of chromium oxide by total weight of the polycrystalline ceramic was maintained and, preferably, around 1% of chromium oxide by total weight of the polycrystalline ceramic.

It is pointed out that the study is more particularly carried out with regard to the study of the variations in color and in the mechanical characteristics of the polycrystalline ceramic as a function of the variation in the proportion of magnesium oxide with a content of around 1% of chromium oxide by total weight of the crystalline ceramic.

This is because it was found that the content of magnesium oxide in the final polycrystalline ceramic influences the hue angle H, the density d and toughness $K_c$. Thus, as seen in tables 1 and 2, the content of magnesium oxide in the polycrystalline ceramic is preferably maintained between 0.03% and 0.09% of magnesium oxide by total weight of the crystalline ceramic in order to be able to benefit both from an opaque red color and from sufficiently high mechanical characteristics.

This is because, after reading table 1, it is noticed, surprisingly, that the toughness $K_c$ increases and then suddenly falls back to the same value as for a low content of magnesium oxide. At the same time, it is seen that, for the same manufacturing process as explained below, the density d values remain substantially equivalent except for example 2, which has a lower density.

Table 2 reveals, also surprisingly, that the colorimetric space of the polycrystalline ceramics follows a trend close to that of the toughness, that is to say increases and then suddenly falls back to the same value as for a low content of magnesium oxide. However, it is noticed that the inflection point is shifted toward a lower value of magnesium oxide than for the toughness and follows a curve which is substantially the inverse of that of the density d.

Example 3 of polycrystalline ceramic obtained during the study gave the best result both as regards the color and the mechanical characteristics. Example 3 comprises substantially 98.92% of alumina (Al$_2$O$_3$), substantially 1.02% chromium oxide (Cr$_2$O$_3$) and substantially 0.06% of magnesium oxide (MgO) with a density d equal to 3.98 g·cm$^{-3}$ and a toughness $K_c$ equal to 3.0 MPa·m$^{1/2}$.

Furthermore, example 3 comprises a CIELAB colorimetric space, the L* component of which is substantially equal to 41.2, the a* component equal to 20.7 and the b* component equal to 8.6, giving a hue angle H equal to 22.5°. This color can be regarded as a color which is deep red, of the burgundy type, and opaque as it revealed a transmission factor T substantially equal to 7.5% for a ceramic thickness of approximately 410 µm and a light source combining all the wavelengths (white light) using an Eldim EZ-Lite conoscope.

An example of a manufacturing process which makes it possible to obtain a polycrystalline ceramic according to the invention will now be explained. Preferably, according to the invention, the manufacturing process is carried out via the liquid route in order to guarantee better uniformity of the different elements in order to thus obtain a polycrystalline ceramic with a highly saturated and uniform color which is colored throughout its body.

The process comprises a first stage intended to form a mixture of the different elements in the powder form. More specifically, the first stage, as total weight of powder, between 0.5 mol % and 0.8 mol % of chromium cations, between 0.04 mol % and 0.12 mol % of magnesium cations and the remainder as aluminum cations using alumina.

The first stage comprises a first phase intended to prepare, separately, alumina powder, chromium salts and magnesium salts.

During the study, the chromium salts were prepared from chromium nitrate $Cr(NO_3)_3*9H_2O$ and the magnesium salts from magnesium acetate $Mg(CH_3COO)_2*4H_2O$. However, the chromium and/or magnesium salts might be introduced in other forms, such as nitrates or hydroxides.

During a second phase, the alumina powder, the chromium salts and the magnesium salts are mixed in water and subjected to stirring until a uniform coloring of the solution is obtained. By way of example, in the case of example 3, 300 g of alumina powder, 16.24 g of chromium nitrate and 1 g of magnesium acetate were mixed with 280 ml of distilled water.

The process is continued with a third phase of drying the suspension in order to obtain a powder of the mixture of the second phase. The third phase can, for example, be obtained using a rotary evaporator intended to remove the water from the solution.

The first stage ends with a fourth phase of calcination of the powder intended to remove the elements introduced with the chromium salts and the magnesium salts, such as, for example, the nitrate or acetate groups or water. Such a fourth phase can be obtained by a heat treatment at several hundred degrees centigrade. At the end of the first stage, a granulated powder is thus obtained. By way of example, in the case of example 3, a mixture, after calcination at 600° C., comprising 0.68 mol % of chromium cations, 0.08 mol % of magnesium cations and 99.24 mol % of aluminum cations in the alumina form, in the powder form, is obtained.

The second stage of the process is intended to grind the granulated powder in order to obtain a powder which is uniform in terms of grain size. Such a second stage can be carried out under dry conditions or in the liquid form.

The third stage of the process is intended to carry out an atomization of the ground powder in order to obtain substantially spherical and uniform aggregates, the diameter of which is between 30 and 120 µm. Such a third stage can be carried out using a customary atomization tower by employing one (or more) adjuvant(s), such as, for example, an organic binder, intended to facilitate the atomization.

A fourth stage is intended to shape the aggregates in order to form a green body of the shape of the final part desired for the polycrystalline ceramic. Such a fourth stage can be obtained, for example, by pressing the aggregates in a mold.

Finally, the process ends with a fifth stage intended to convert the green body into a polycrystalline ceramic according to the invention. The fifth stage can, for example, comprise a first binder-removing phase, intended to remove, from the green body, any adjuvant introduced during the atomization, and then a second sintering phase. Each phase is mainly characterized by the temperature applied to the green body. Thus, the temperature during the first phase can be between 300° C. and 700° C., whereas the temperature, during the second phase, is between 1400° C. and 1700° C. By way of example, in the case of example 3, a first phase at 600° C. and then a second phase at 1600° C. under air are carried out.

By way of example, in the case of example 3, exterior parts were manufactured for timepieces, such as, in particular, a bezel and a moon phase. Thus, in the case of example 3, the process made it possible to obtain an opaque red ceramic which comprises substantially 98.92% of alumina ($Al_2O_3$), substantially 1.02% of chromium oxide ($Cr_2O_3$) and substantially 0.06% of magnesium oxide (MgO) with a density d equal to 3.98 $g \cdot cm^{-3}$.

More specifically, after measurement by spectrophotometry, the polycrystalline ceramic of example 3 comprises a CIELAB colorimetric space, the component L* of which is substantially equal to 41.2, the component a* equal to 20.7 and the component b* equal to 8.6, giving a hue angle H equal to 22.5° corresponding to a deep red opaque color of the burgundy type of the most beautiful effect for a timepiece.

Finally, after measurement, the polycrystalline ceramic of example 3 comprises a toughness $K_c$ equal to 3.0 $MPa \cdot m^{1/2}$, which, surprisingly as it concerns an alumina-based ceramic, makes it possible to inlay, subsequent to the manufacture of the polycrystalline ceramic, metal inserts, such as, for example, according to the process disclosed in the document EP 2 315 673, incorporated by reference in the present description. It has, in particular, been possible to inlay a graduation made of amorphous metal alloy in a bezel manufactured from an opaque red ceramic of example 3 according to the invention.

Of course, the present invention is not limited to the example illustrated but is capable of various alternative forms and modifications which will be apparent to a person skilled in the art. In particular, the invention cannot be limited to an exterior part or even to the watchmaking field. Thus, by way of example, there is nothing to prevent the use of the polycrystalline ceramic according to the invention for an application in the field of the art of entertaining or jewelry.

Furthermore, the study also revealed that the fourth stage intended to shape the aggregates can influence the color of the final polycrystalline ceramic. It has been shown that darker or paler reds for each composition of examples 1 to 5 above can be obtained according to the method employed. After analysis, it is in fact the density of the polycrystalline ceramic which will bring about the variation in its colorimetric space.

For tables 1 and 2, the process employed remained rigorously the same in order to be able to compare the results obtained. More specifically, the fourth stage always used a pressing employing an industrial uniaxial press where only the displacement is controlled.

Additional measurements were carried out using a fourth alternative stage comprising a cold uniaxial pressing (also known under the abbreviation UP), followed by a cold isostatic pressing (also known under the abbreviation CIP). The cold uniaxial pressing makes it possible for the press to choose not a predetermined displacement but a predetermined pressure to be applied to the aggregates in the mold, whereas, for the cold isostatic pressing, the sample is immersed in a bath (or water or oil) which is subsequently pressurized.

The mechanical characteristics of the alternative forms 3' and 5' of examples 3 and 5 due to the pressing are combined in table 3 below:

TABLE 3

|    | L*   | a*   | b*   | C    | H °  | d g · cm⁻³ |
|----|------|------|------|------|------|------------|
| 3  | 41.2 | 20.7 | 8.6  | 22.4 | 22.5 | 3.98       |
| 3' | 38.7 | 18.3 | 6.7  | 19.5 | 20.2 | 3.99       |
| 5  | 42.5 | 22.2 | 10.2 | 24.4 | 24.6 | 3.96       |
| 5' | 37.5 | 15.4 | 5.5  | 16.3 | 19.8 | 4.00       |

Table 3 immediately shows that the density d obtained is greater for the same proportions (example 3 or 5 versus example 3' or 5') of alumina, of chromium oxide and of magnesium oxide in the polycrystalline ceramic. It is noticed that this higher density d influences the red color obtained by rendering the red deeper.

It is thus understood that, for one and the same polycrystalline ceramic composition according to the invention, the greater the density d, the lower the hue angle H, and, conversely, the lower the density d, the greater the hue angle H. Advantageously, according to the invention, the polycrystalline ceramic preferably comprises a density at least equal to 3.9 g·cm⁻³ in order to maintain the advantages of the invention.

The invention claimed is:

1. A polycrystalline ceramic solely formed based on alumina, on chromium oxide and on magnesium oxide, wherein the polycrystalline ceramic comprises between 0.8% and 1.2% of chromium oxide by total weight of the polycrystalline ceramic and between 0.03% and 0.09% of magnesium oxide by total weight of the polycrystalline ceramic, making it possible to obtain a red ceramic with a toughness ($K_c$) at least equal to 2.8 MPa·m$^{1/2}$.

2. The polycrystalline ceramic of claim 1, wherein the polycrystalline ceramic has a density at least equal to 3.9 g·cm⁻³.

3. The polycrystalline ceramic of claim 1, wherein the polycrystalline ceramic comprises a CIELAB colorimetric space, the hue angle (H) of which is between 19° and 27°.

4. The polycrystalline ceramic of claim 3, wherein the polycrystalline ceramic comprises a CIELAB colorimetric space, the L* component of which is between 37 and 45, the a* component of which is between 15 and 26 and the b* component of which is between 5 and 13.

5. The polycrystalline ceramic of claim 3, wherein the polycrystalline ceramic comprises substantially 98.92% of alumina, substantially 1.02% of chromium oxide and substantially 0.06% of magnesium oxide.

6. A timepiece, comprising a member completely or partially formed using a polycrystalline ceramic of claim 1.

7. A process for the manufacture of a polycrystalline ceramic of claim 1, the process comprising:
  a) forming a mixture in a powder form comprising between 0.5 mol % and 0.8 mol % of chromium cations, between 0.04 mol % and 0.12 mol % of magnesium cations and the remainder as aluminum cations in the alumina form;
  b) grinding the powder;
  c) carrying out an atomization of the ground powder in order to obtain aggregates;
  d) shaping the aggregates in order to obtain a green body; and
  e) transforming the green body into ceramic in order to obtain the polycrystalline ceramic.

8. The process of claim 7, wherein the forming a) is carried out by a liquid route.

9. The process of claim 7, wherein the aggregates obtained during the carrying out c) are substantially spherical and have a diameter of between 30 and 120 μm.

10. The process of claim 7, wherein the shaping d) comprises a pressing of the aggregates in a mold.

11. The process of claim 7, wherein the transforming e) comprises a sintering of the green body.

* * * * *